(12) United States Patent  
Alameh et al.

(10) Patent No.: US 9,218,472 B2
(45) Date of Patent: Dec. 22, 2015

(54) PIEZO BASED FINGERPRINT SENSOR STRUCTURE

(71) Applicant: Google Technology Holdings LLC, Mountain View, CA (US)

(72) Inventors: Rachid M. Alameh, Crystal Lake, IL (US); Jiri Slaby, Buffalo Grove, IL (US); Paul R. Steuer, Hawthorn Woods, IL (US)

(73) Assignee: Google Technology Holdings LLP, Mountain View, CA (US)

( * ) Notice: Subject to any disclaimer, the term of this patent is extended or adjusted under 35 U.S.C. 154(b) by 332 days.

(21) Appl. No.: 13/721,327

(22) Filed: Dec. 20, 2012

(65) Prior Publication Data

US 2014/0176332 A1  Jun. 26, 2014

(51) Int. Cl.
*G08B 21/00* (2006.01)
*G06F 21/32* (2013.01)
*G08B 1/08* (2006.01)
*G06K 9/00* (2006.01)

(52) U.S. Cl.
CPC .............. *G06F 21/32* (2013.01); *G06K 9/0002* (2013.01); *G06K 9/00912* (2013.01); *G08B 1/08* (2013.01)

(58) Field of Classification Search
None
See application file for complete search history.

(56) References Cited

U.S. PATENT DOCUMENTS 3,781,855 A * 12/1973 Killen ........................... 382/126
5,963,679 A * 10/1999 Setlak ........................... 382/312
6,144,757 A * 11/2000 Fukuzumi .................... 382/124
6,206,238 B1 * 3/2001 Ophardt ............................ 222/1
8,310,372 B2 * 11/2012 Kukula et al. ................. 340/665
2005/0100198 A1 5/2005 Nakano et al.
2005/0113071 A1 * 5/2005 Nagata .......................... 455/411
2005/0123177 A1 * 6/2005 Abiko ........................... 382/124
2005/0152584 A1 * 7/2005 Svedin .......................... 382/124
2005/0194866 A1 9/2005 Scott
2008/0121442 A1 5/2008 Boer et al.
2009/0169070 A1 * 7/2009 Fadell ........................... 382/124
2011/0032077 A1 * 2/2011 Setlak et al. ................. 340/5.83

FOREIGN PATENT DOCUMENTS

WO         0171648 A2   9/2001

OTHER PUBLICATIONS

Patent Cooperation Treaty, International Search Report and Written Opinion of the International Searching Authority for International Application No. PCT/US2013/07557, Feb. 4, 2014, 11 pages.

* cited by examiner

*Primary Examiner* — Travis Hunnings
(74) *Attorney, Agent, or Firm* — Morris & Kamlay LLP (57) ABSTRACT

A device includes both a fingerprint sensor (112) and a piezo structure (114). The fingerprint sensor senses fingerprint data identifying a pattern of a fingerprint of a user. The fingerprint data for the user can be collected and analyzed in various manners in order to authenticate the sensed fingerprint. The piezo structure can be used in various manners, such as to collect data used to facilitate authenticating the sensed fingerprint data, to provide feedback to the user regarding when the fingerprint authentication process is complete, and/or to cause different types of vibration in order to facilitate sensing fingerprint data. Various additional feedback can also be provided to the user, using the piezo structure or other feedback mechanisms, such as feedback to notify the user to increase or decrease an amount of pressure he or she is applying to the fingerprint sensor.

19 Claims, 10 Drawing Sheets

PIEZO BASED FINGERPRINT SENSOR STRUCTURE

BACKGROUND

One way in which access to systems or devices can be controlled is through the use of fingerprint authentication, in which a user's fingerprint is captured by a fingerprint sensor and authenticated. However, current fingerprint sensors are not without their problems. One such problem is that users oftentimes apply variable and inconsistent amounts of pressure to the fingerprint sensor, reducing the ability of the sensor to authenticate the user. Another such problem is that moisture on the fingerprint sensor or the user's finger can reduce the ability of the fingerprint sensor to detect the user's fingerprint, thus reducing the ability of the sensor to authenticate the user. The reduced ability of the sensor to authenticate the user can result in false rejections where the user does not have his or her fingerprint authenticated, which can lead to user frustration and dissatisfaction with the system or device.

BRIEF DESCRIPTION OF THE DRAWINGS

Embodiments of a piezo based fingerprint sensor structure are described with reference to the following drawings. The same numbers are used throughout the drawings to reference like features and components.

DETAILED DESCRIPTION

A piezo based fingerprint sensor structure is discussed herein. A device includes both a fingerprint sensor and a piezo structure. The fingerprint sensor senses fingerprint data identifying a pattern of a user's fingerprint. The fingerprint data for the user can be collected and analyzed in various manners in order to authenticate the sensed fingerprint. The piezo structure can be used in various manners, such as to collect data used to facilitate authenticating the sensed fingerprint data, to provide feedback to the user regarding when the fingerprint authentication process is complete, to cause different types of vibration in order to facilitate sensing fingerprint data, and so forth. Various additional feedback can also be provided to the user, using the piezo structure or other feedback mechanisms, such as feedback to notify the user to increase or decrease an amount of pressure he or she is applying to the fingerprint sensor.

Figure 1:
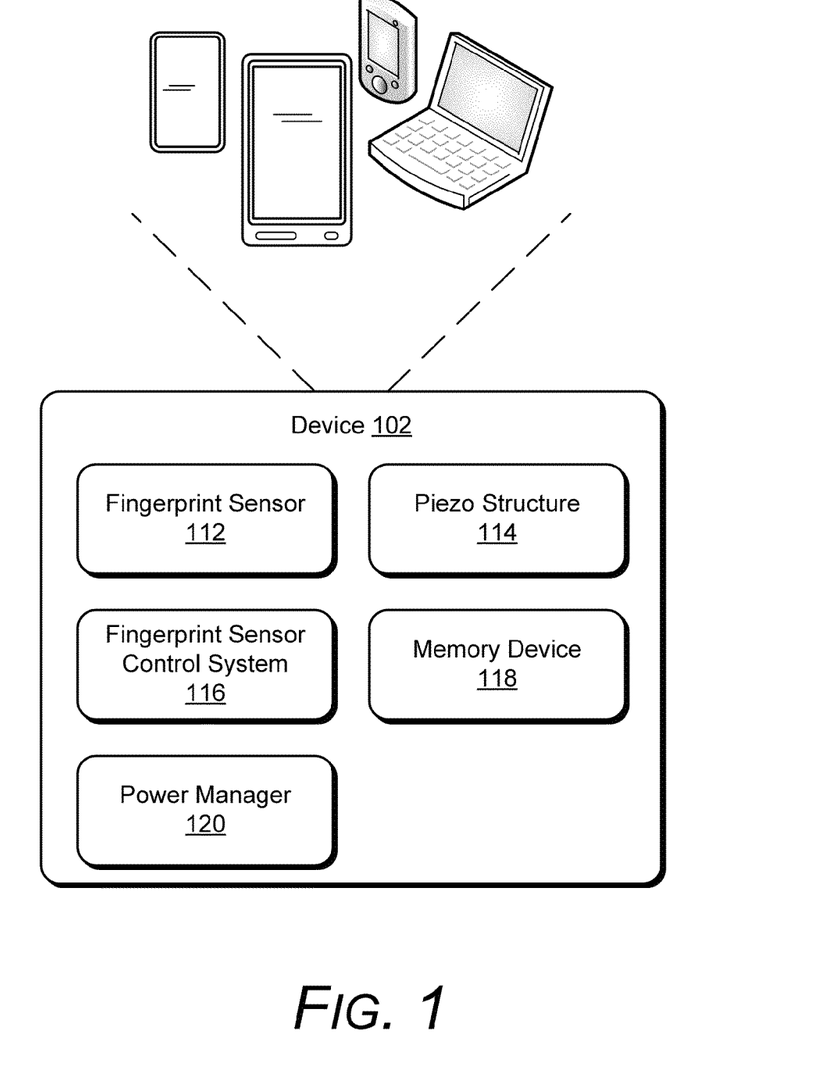
FIG. 1 illustrates an example device in accordance with one or more embodiments.

FIG. 1 illustrates an example device 102 in accordance with one or more embodiments. The device 102 can be any of a variety of different types of devices, such as a laptop computer, a cellular or other wireless phone, a tablet computer, an entertainment device, an audio and/or video playback device, a server computer, and so forth. The device 102 includes a fingerprint sensor 112, a piezo structure 114, a fingerprint sensor control system 116, a memory device 118, and a power manager 120.

The fingerprint sensor 112 senses fingerprint data of a user's finger touching the sensor 112. The fingerprint data identifies a fingerprint's pattern on the finger, typically identifying the location of various ridges or minutiae of the fingerprint. Fingerprint sensor 112 can be implemented using any of a variety of different technologies and types of sensors, such as capacitive sensors, pressure sensors, optical sensors, thermal sensors, ultrasonic sensors, imaging sensors, and so forth.

The piezo structure 114 is a piezo device, such as a piezoelectric sensor, that measures the pressure or force applied to the piezo structure 114 and outputs an indication of that pressure or force as an electrical charge. In one or more embodiments, the piezo structure 114 generates and outputs a current or voltage that varies in accordance with the pressure or force applied to the fingerprint sensor 112. A voltage or current can also be applied to the piezo structure 114, which causes the piezo structure 114 to vibrate. The voltage or current is applied to the piezo structure as one or more signals that drive the piezo structure. Vibration of the piezo structure 114 can be used to provide haptic and/or audio feedback to a user of the device 102 for various purposes while sensing fingerprint data and/or authenticating a fingerprint, as discussed in more detail below.

The fingerprint sensor control system 116 analyzes fingerprint data for a fingerprint sensed by the fingerprint sensor 112 in order to authenticate the fingerprint. Various data regarding the user's fingerprint is stored in the memory device 118, which can be volatile and/or nonvolatile memory (e.g., RAM, Flash memory, magnetic disk, etc.). The control system 116 uses this stored data to authenticate the fingerprint. The fingerprint sensor control system 116 can also use data received from the piezo structure 114 indicating an amount of pressure or force applied to the fingerprint sensor by the finger, as discussed in more detail below. The fingerprint sensor control system 116 can also control a voltage or current applied to the piezo structure 114 in order to provide feedback to a user of the device 102. The control system 116 can also control various other feedback components, including haptic, audible, visual, and so forth components to provide feedback to a user of the device, as discussed in more detail below.

It should be noted that fingerprint authentication can be performed by the device 102 for its own use and/or used by another system or device. For example, the control system 116 can authenticate fingerprints in order to allow a user to access the device 102 itself, programs or applications running on the device 102, other modules or components of the device 102, and so forth. Alternatively, the control system 116 can authenticate fingerprints in order to allow a user to access another system or device coupled to the device 102, another system or device accessed by the device 102 via the Internet or other network, and so forth.

The power manager 120 manages power modes, including changing power modes, of the device. These power modes can include an on (e.g., power on) mode and an off (e.g., power off) mode. These power modes can also optionally include one or more low power usage modes (e.g., modes having a reduced number of components that are powered on, modes having reduced performance of components, and so forth) such as a sleep mode, and/or one or more high power usage modes (e.g., modes having an increased number of components that are powered on, modes having increased performance of components, and so forth). The power manager 120 can change the power mode of the device 102 by performing a power-on sequence to turn on the device 102 when a power on command or input is received, and can change the power mode of the device 102 by performing a power-down sequence to turn off the device 102 when a power off command or input is received. The power manager 120 can also change the power mode of the device 102 by transitioning to a higher power usage mode when a wake input or other indication of additional desired performance is received, and can change the power mode of the device 102 by transitioning to a lower power usage mode when a sleep input or other indication of additional desired energy conservation is received.

Figure 2:
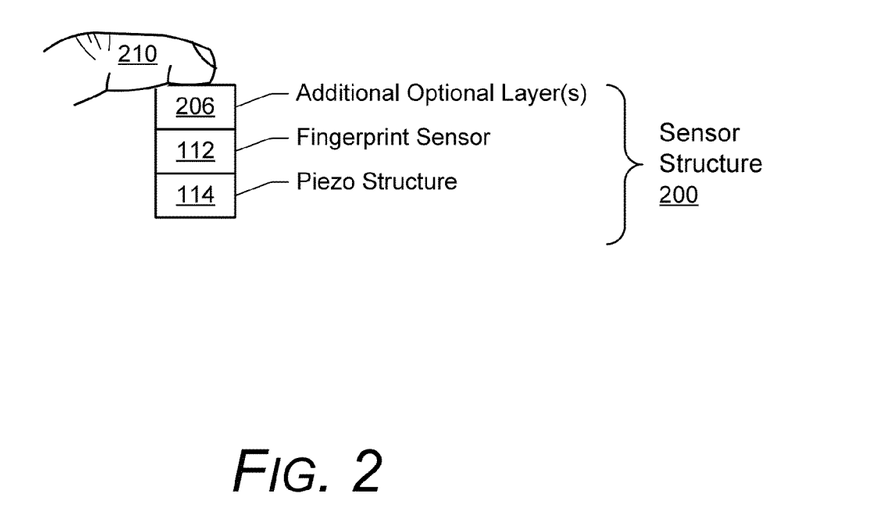
FIG. 2 illustrates an example sensor structure in accordance with one or more embodiments.

FIG. 2 illustrates an example sensor structure 200 in accordance with one or more embodiments. Sensor structure 200 includes the piezo structure 114, and fingerprint sensor 112 referenced in FIG. 1, and one or more additional optional layers 206 The one or more layers 206 are referred to as being at the top of the sensor structure 200, and the piezo structure 114 is referred to as being at the bottom of the sensor structure 200. The fingerprint sensor 112 is implemented on top of the piezo structure 114, and thus is also referred to as being situated on the piezo structure 114.

As illustrated in FIG. 2, the fingerprint sensor 112 and the piezo structure 114 are implemented as part of the same sensor structure 200. Thus, as a user's finger 210 touches one of the layers 206 at the top of the sensor structure 200, pressure is applied to the sensor structure 200. This applied pressure can be sensed by the piezo structure 114. Additionally, as the pressure is applied to the sensor structure 200, the fingerprint sensor 112 can sense the fingerprint on the finger 210.

The one or more layers 206 can provide various functionality, such as protection from scratches and abrasions, or water repelling. The one or more layers 206 are optional and need not be included in the sensor structure 200. It should also be noted that, although illustrated as being at the top of the sensor structure 200, one or more additional layers can optionally be included between the fingerprint sensor 112 and the piezo structure 114, and/or optionally be included below the piezo structure 114.

In the illustrated example of FIG. 2, the piezo structure 114 is illustrated as being part of the sensor structure 200. Alternatively, in one or more embodiments the piezo structure 114 can be implemented separately from the sensor structure 200 and/or an additional piezo structure can be included in addition to the piezo structure 114.

Figure 3:
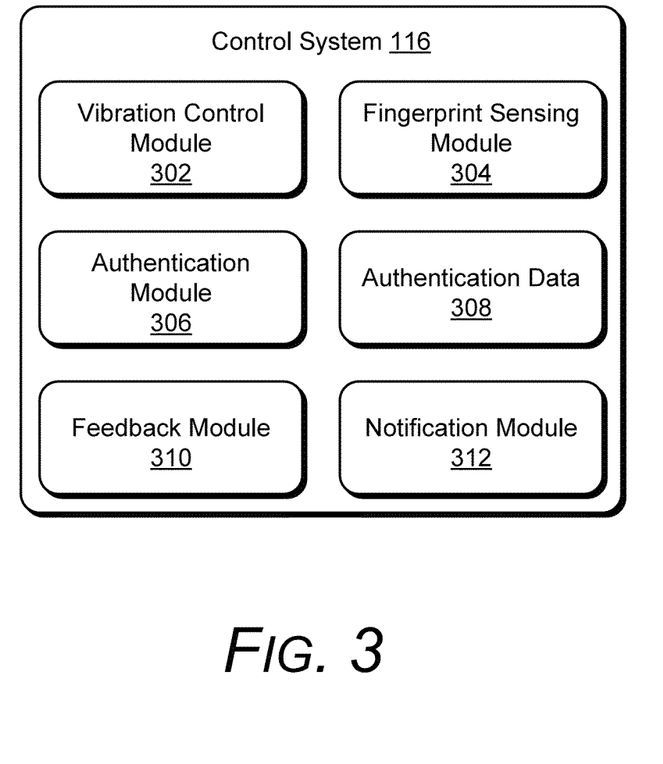
FIG. 3 illustrates an example control system in accordance with one or more embodiments.

FIG. 3 illustrates the control system 116 of FIG. 1 in accordance with one or more embodiments. The control system 116 includes a vibration control module 302, a fingerprint sensing module 304, an authentication module 306, authentication data 308, a feedback module 310, and a notification module 312. Although particular functionality is discussed herein with reference to particular modules, it should be noted that the functionality of individual modules discussed herein can be separated into multiple modules, and/or at least some functionality of multiple modules can be combined into a single module.

Generally, the control system 116 receives fingerprint data sensed by the fingerprint sensor 112. The control system 116 optionally also receives an indication (e.g., a voltage or current) from the piezo structure 114 indicating an amount of pressure applied to the piezo structure 114, this indication also being referred to as pressure data. The control system 116 can use the piezo structure 114 in different manners when sensing and/or authenticating the fingerprint data. For example, the control system 116 can vibrate the piezo structure 114 while collecting and/or analyzing the fingerprint data, use the pressure data to determine which stored fingerprint data to compare to the sensed fingerprint data, and so forth as discussed in more detail below.

The vibration control module 302 controls the vibration of the piezo structure 114, including starting and stopping the vibration of the piezo structure 114. Controlling the piezo structure 114 can also include changing the vibration of the piezo structure 114 by altering one or more signals used to drive the piezo structure 114. The piezo structure 114 can be vibrated in various different manners using different vibration characteristics that alter the one or more signals used to drive the piezo structure 114. A collection of one or more vibration characteristics is also referred to as a vibration pattern. The vibration characteristics include one or more of the following: the frequency of each of the one or more signals, the amplitude of each of the one or more signals, the wave shape (e.g., square, triangular, etc.) of each of the one or more signals, the duty cycle of each of the one or more signals, wave phase, a duration of bursts of vibration indicated by each of the one or more signals, whether each of the one or more signals is a sweep signal and parameters of the sweep signal, other modulation factors, and so forth.

The vibration control module 302 can control the vibration of the piezo structure for various different reasons and in different manners in order to support various different embodiments. In one embodiment, the vibration of the piezo structure 114 is changed to provide feedback to a user regarding the amount of pressure he or she should apply to the fingerprint sensor, such as at any given time indicating whether he or she should apply more pressure or less pressure than is currently being applied. In another embodiment, vibration of the piezo structure 114 starts when the user applies pressure to the fingerprint sensor, and stops when the fingerprint data has been authenticated. In yet another embodiment, vibration of the piezo structure 114 is changed to cause the user to alter the pressure he or she is applying to the fingerprint sensor in order to obtain different fingerprint data. In other embodiments, vibration of the piezo structure is changed to expel water or other liquid from between ridges of the fingerprint of the user. These various embodiments are discussed in more detail below.

The fingerprint sensing module 304 receives the fingerprint data, also referred to as the sensed fingerprint data, from the fingerprint sensor 112. The fingerprint data identifies a pattern of a user's fingerprint that was sensed or detected by the fingerprint sensor. In one embodiment, this fingerprint data is an indication of the locations where minutiae or ridges of the fingerprint are sensed or identified by the fingerprint sensor. The locations can be identified in various different manners, such as using a 2-dimensional Cartesian coordinate system in which the locations where minutiae or ridges are sensed are identified using x,y coordinates. Alternatively, other coordinate systems can be used, such as Polar coordinate systems, proprietary coordinate systems, and so forth.

The fingerprint sensing module 304 receives the fingerprint data from the fingerprint sensor 112 and makes the fingerprint data available to the authentication module 306. Alternatively, the fingerprint sensor 112 can provide the fingerprint data to the authentication module 306, bypassing the fingerprint sensing module 304.

The authentication data 308 includes data indicating one or more correct or representative fingerprint data samples for a user. The authentication data 308 can be stored, for example, in memory device 118 of FIG. 1. A fingerprint data sample can be stored as part of the authentication data during an enrollment process, which refers to a process during which the user is setting up or initializing the control system 116 to authenticate his or her fingerprint. Alternatively, one or more fingerprint data samples can be stored at other times, as discussed in more detail below.

The authentication module 306 analyzes the sensed fingerprint data and compares it to stored fingerprint data maintained as part of the authentication data 308. Based on this comparison, the authentication module 306 determines whether the fingerprint satisfies the authentication data 308. When the fingerprint satisfies the authentication data (e.g., the fingerprint data matches stored fingerprint data), the fingerprint authentication succeeds and the fingerprint is authenticated. When the fingerprint does not satisfy the authentication data (e.g., the fingerprint data does not match stored fingerprint data), the fingerprint authentication fails and the fingerprint is not authenticated. The authentication module 306 can make this comparison in different manners in accordance with various different embodiments. In one embodiment, the authentication module 306 compares the sensed fingerprint data to the authentication data 308 and determines whether the sensed fingerprint data matches stored fingerprint data for the user. In another embodiment, the authentication module 306 combines multiple samples of sensed fingerprint data to generate candidate fingerprint data, compares the candidate fingerprint data to the authentication data 308, and determines whether the candidate fingerprint data matches stored fingerprint data for the user. In yet another embodiment, the authentication module 306 determines which of multiple samples of stored fingerprint data to compare to the sensed fingerprint data based on an amount of pressure applied by the user's finger as indicated by the piezo structure 114. These various embodiments are discussed in more detail below.

The authentication module 306 can determine whether two fingerprint data (e.g., sensed fingerprint data and stored fingerprint data, candidate fingerprint data and stored fingerprint data, etc.) match in various different manners. In one embodiment, the locations where minutiae or ridges are detected as indicated in the two fingerprint data are compared. If the number of corresponding locations in the two fingerprint data where minutiae or ridges are detected satisfies (e.g., is equal to and/or greater than) a threshold value, the two fingerprint data match; otherwise, the two fingerprint data do not match. Various different correlation or alignment techniques can be used to align the two fingerprint data so that corresponding locations (e.g., the same coordinates relative to an origin or other reference point) can be readily identified. Alternatively, various other public and/or proprietary pattern matching techniques can be used to determine whether two fingerprint data match.

The feedback module 310 provides feedback to indicate to a user, while his or her finger is touching the fingerprint sensor, whether the pressure he or she is applying is less than a target pressure or greater than a target pressure. The target pressure can be determined in various manners, such as during an enrollment process. The feedback module 310 can provide at least two types of indications: one type indicating that the amount of pressure being applied is less than the target pressure and thus that the user should apply more pressure (e.g., press harder), and another type indicating that the amount of pressure being applied is greater than the target pressure and thus that the user should apply less pressure (e.g., press lighter). Other types of indications can also be provided, such as an indication that the amount of pressure being applied is the target pressure (or within a threshold amount of the target pressure), an indication that the amount of pressure being applied is significantly less than the target pressure (e.g., at least another threshold amount less than the target pressure), an indication that the amount of pressure being applied is significantly greater than the target pressure (e.g., at least another threshold amount greater than the target pressure), and so forth.

The feedback module 310 can provide feedback in various different manners. In one embodiment, the feedback is haptic feedback, with the vibration of the piezo structure 114 being changed to provide the feedback or the haptic feedback could be generated by another vibrator in the device. In another embodiment, the feedback is audible, with the vibration of the piezo structure 114 being changed to provide the feedback or one or more signals applied to a speaker to provide the feedback. In yet another embodiment, the feedback is visual, with one or more lights being illuminated, portions of a display screen being illuminated, and so forth to provide the feedback.

The feedback module 310 can also provide feedback to indicate to a user that too much pressure is being applied for control system 116 to function properly. For example, if the pressure data received from the piezo structure 114 indicates that at least a particular threshold pressure is being applied to the piezo structure 114, the feedback module 310 indicates to the user that he or she should not press down as hard as he or she is currently pressing. This feedback can be provided in different ways analogous to the discussion above, such as using haptic feedback, audible feedback, visual feedback, and so forth. The feedback module 310 can check whether at least the particular threshold pressure is being applied to the piezo structure 114 throughout the fingerprint data sensing and authentication process, effectively providing feedback to the user if he or she is applying too much pressure at any time when pressure is applied to the piezo structure 114.

The notification module 312 provides a notification to one or more other components or modules of a device 102 in response to at least a threshold pressure being applied to the piezo structure 114. This notification can be provided in a variety of different manners, such as by applying a particular voltage to a control line or other input of a component or module, invoking or otherwise activating an interface exposed by the component or module, and so forth. The notification can be used by other components or modules as a trigger for performing various operations or providing various functionality.

In one embodiment, the notification is provided to the power manager 120, which can take various actions to change the power mode of the device 102 in response to the notification and based on a current power mode of the device 102. For example, in response to the notification when the device is turned off, the power manager 120 can change the power mode of the device 102 by initiating a power-on sequence for the device 102 to turn on the device 102. In response to the notification when the device is turned on, the power manager 120 can change the power mode of the device 102 by initiating a power-off sequence for the device 102 to turn off the device. Thus, the sensor structure 200 can be used as a power switch for the device 102. As part of this power-on and/or power-off sequence, the user's fingerprint can optionally be authenticated as discussed herein, so that the device 102 is powered-on or powered-off only if the user's fingerprint is authenticated.

By way of another example, in response to the notification when the device is in a low power usage mode, the power manager 120 can change the power mode of the device 102 by initiating a power increase sequence (e.g., a wake sequence) for the device 102 to transition the device 120 to a higher power usage mode. In response to the notification when the device 102 is in a higher power usage mode, power manager 120 can change the power mode of the device 102 by initiating a power decrease sequence (e.g., a sleep sequence) for the device 102 to transition the device to a lower power usage mode. Thus, the sensor structure 200 can be used as a switch to put the device 102 into a higher power usage mode (e.g., wake up the device) and/or put the device 102 into a lower power usage mode (e.g., put the device to sleep). As part of this power increase and/or power decrease sequence, the user's fingerprint can optionally be authenticated as discussed herein, so that the device 102 is changed to a higher power usage mode or a lower power usage mode only if the user's fingerprint is authenticated.

In various discussions herein, reference is made to vibrating the sensor structure 200 or piezo structure 114 while sensing the fingerprint data. This vibrating while sensing can facilitate authenticating the fingerprint in various manners. For example, a typical user reaction to vibration of the sensor structure 200 is to change the pressure applied to the sensor structure. This change in pressure may be small and may not be noticeable to the user, but can be present nonetheless. This change in pressure can result in additional minutiae or ridges being sensed by the fingerprint sensor 112, thus making additional fingerprint data available to the authentication module 306 when determining whether stored fingerprint data for the user is matched.

By way of another example, situations can arise in which the user has moisture (water or other liquids) on his or her finger. By vibrating the sensor structure, the moisture can be expelled from between minutiae or ridges of the user's fingerprint. Expelling such water can result in the fingerprint sensor 112 sensing additional minutiae or ridges, thus making additional fingerprint data available to the authentication module when determining whether stored fingerprint data for the user is matched.

Various different embodiments for using the piezo based fingerprint sensor structure discussed herein are discussed with reference to the flowcharts of FIGS. 4-9. It should be noted that actions set forth in different embodiments can optionally be combined and implemented concurrently. Each of the processes in FIGS. 4-9 is implemented by a device, such as the device 102 of FIG. 1. Various aspects of these processes can be implemented by a fingerprint sensor control system of a device, such as the control system 116 of FIG. 3. Each of the processes in FIGS. 4-9 can be implemented in software, firmware, hardware, or combinations thereof. Each of the processes in FIGS. 4-9 is shown as a set of acts and is not limited to the order shown for performing the operations of the various acts. Additionally, each of the processes in FIGS. 4-9 is an example of using the piezo based fingerprint sensor structure discussed herein; additional discussions of using the piezo based fingerprint sensor structure are included herein with reference to different FIGS.

Figure 4:
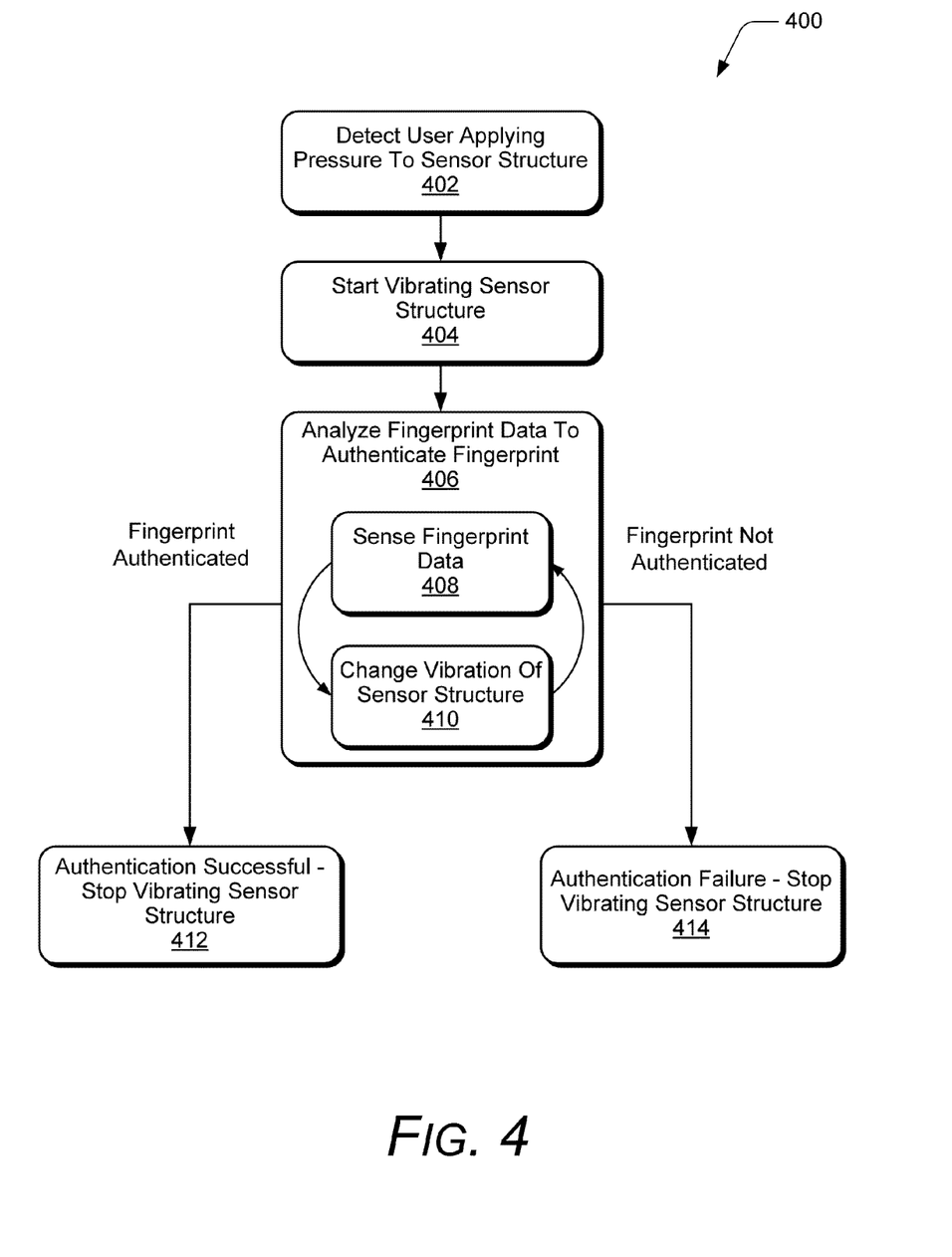
FIG. 4 illustrates an example process in which the vibration of a sensor structure is changed by changing the vibration of a piezo structure included in the sensor structure in accordance with one or more embodiments.

FIG. 4 illustrates an example process 400 in which vibration of a sensor structure 200 is changed by altering the vibration of a piezo structure 114 included in the sensor structure 200 in accordance with one or more embodiments. In process 400, a user applying pressure to the sensor structure 200 is detected (act 402). The sensor structure 200 includes a fingerprint sensor 112 and a piezo structure 114. A user applying pressure to the sensor structure is detected by the piezo structure 114 in response to at least a threshold pressure being applied to the piezo structure.

In response to detecting the user applying pressure to the sensor structure, the control system 116 starts vibrating the sensor structure (act 404). The control system starts vibrating the sensor structure 200 by starting vibrating the piezo structure 114 included in the sensor structure 200. The piezo structure 114 can be vibrated in accordance with any of a variety of vibration patterns as discussed above.

After vibrating of the sensor structure has started, fingerprint data is analyzed in an attempt to authenticate the user's fingerprint (act 406). During the analysis in act 406, the fingerprint sensor 112 senses fingerprint data (act 408) and the vibration control module 302 changes the vibration of the sensor structure 200 (act 410). The vibration control module 302 can change the vibration of the sensor structure 200 by altering the vibrating of the piezo structure 114 in accordance with any of a variety of vibration patterns as discussed above. The vibration control module 302 can change the vibration of the sensor structure 200 in accordance with one or more predefined patterns and/or in accordance with one or more patterns obtained from another module or system. Alternatively, the vibration control module 302 can change the vibration of the sensor structure 200 in a variable manner by randomly or pseudo-randomly selecting vibration characteristics.

Acts 408 and 410 are repeated during analysis of the fingerprint data. Thus, in act 406, fingerprint data is repeatedly sensed while vibration of the sensor structure is changed and the sensed fingerprint data is analyzed to authenticate the fingerprint. The fingerprint satisfies the authentication data and is successfully authenticated when analysis of the fingerprint data determines that the fingerprint data matches fingerprint data stored as part of the authentication data for the user as discussed above. In such a case, the vibration control module 302 stops vibrating the sensor structure 200 (act 412).

When the fingerprint does not satisfy the authentication data, the fingerprint authentication fails and the vibration control module 302 stops vibrating the sensor structure 200 (act 414). In situations in which the fingerprint does not satisfy the authentication data, the control system 116 can determine how long to analyze the fingerprint data in an attempt to successfully authenticate the fingerprint data in a variety of different manners. For example, the control system 116 can obtain (e.g., be preconfigured with, receive from another module or system, and so forth) an indication of a particular number of seconds to analyze the fingerprint data before determining that the fingerprint is not authenticated. By way of another example, the control system 116 can continue to analyze the fingerprint data for as long as at least a threshold pressure is being applied by the user to the sensor structure 200.

It should be noted that in process 400 vibration of the sensor structure 200 starts in response to detection of a user applying pressure to the sensor structure 200, and ends when the authentication either succeeds or fails. The vibration thus provides haptic feedback to the user indicating when analysis of his or her fingerprint begins and ends. The user therefore knows that the authentication of his or her fingerprint is not completed until the vibration of the sensor structure 200 stops, and correspondingly knows that the authentication of his or her fingerprint is completed at the time the vibration of the sensor structure 200 stops.

Figure 5:
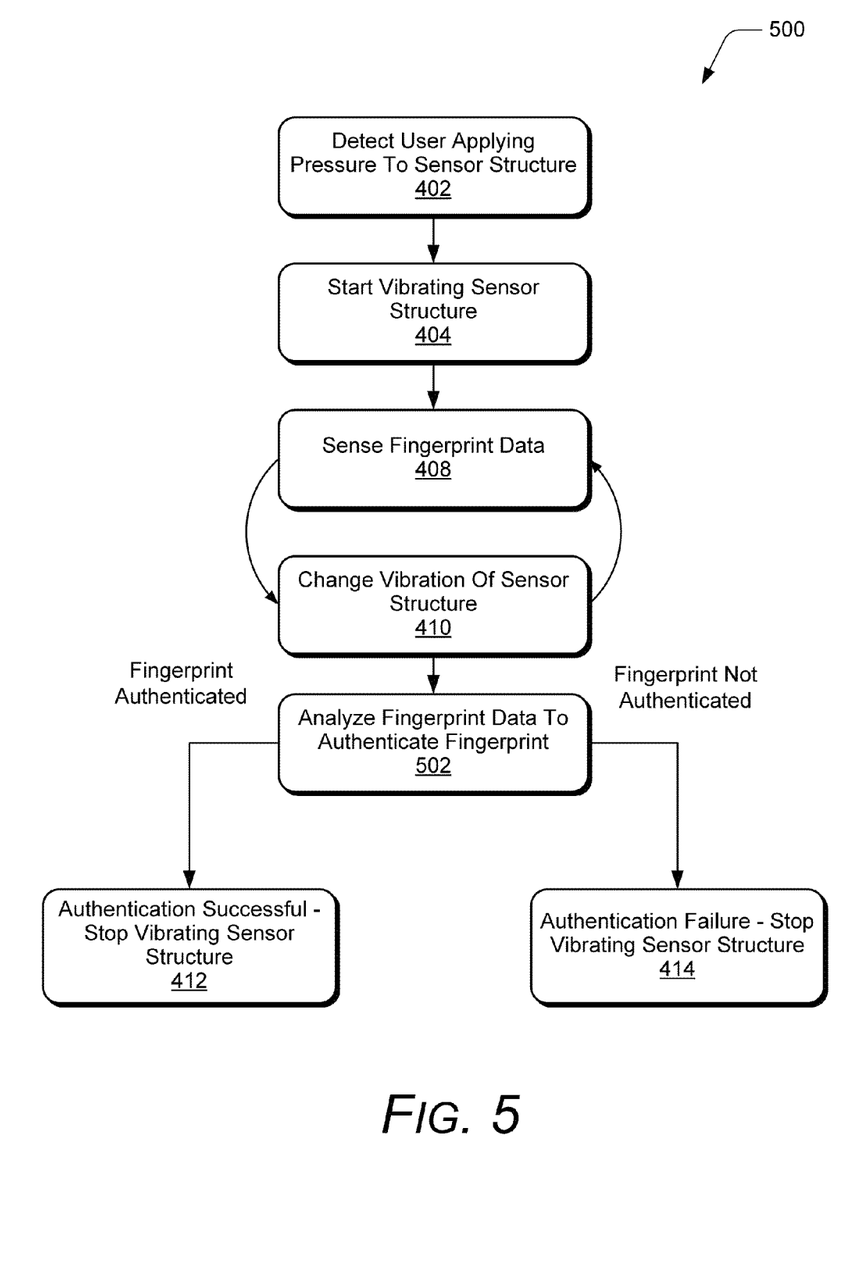
FIG. 5 illustrates another example process in which the vibration of a sensor structure is changed by changing the vibration of a piezo structure included in the sensor structure in accordance with one or more embodiments.

FIG. 5 illustrates another example process 500 in which the vibration of a sensor structure 200 is changed by altering the vibration of a piezo structure 114 included in the sensor structure 200 in accordance with one or more embodiments. Process 500 is similar to process 400 of FIG. 4, including the acts 402, 404, 408, 410, 412, and 414 as discussed above with reference to FIG. 4.

However, process 500 differs from process 400 in that sensing the fingerprint data and the change in vibration of the sensor structure 200 does not occur during analysis of the fingerprint data. Rather, analysis of the fingerprint data to authenticate the fingerprint (act 502) occurs after the fingerprint data is repeatedly sensed and the vibration of the sensor structure 200 is repeatedly changed in acts 408 and 410. Generally, in process 500 the fingerprint data is collected (sensed) while changing vibration of the sensor structure 200, and then after the fingerprint data collection and vibration changing is completed, the fingerprint data is analyzed to authenticate the fingerprint. In contrast, in process 400, the fingerprint data is analyzed to authenticate the fingerprint while the fingerprint data is being collected and the vibration of the sensor structure 200 is being changed.

The control system 116 can determine how long to repeat the sensing of fingerprint data and changing of the vibration of the sensor structure 200 in acts 408 and 410 in a variety of different manners. For example, the control system 116 can obtain (e.g., be preconfigured with, receive from another module or system, and so forth) an indication of a particular number of seconds to repeat acts 408 and 410, can obtain (e.g., be preconfigured with, receive from another module or system, and so forth) an indication of how many samples of fingerprint data to sense in act 408, and so forth.

Figure 6:
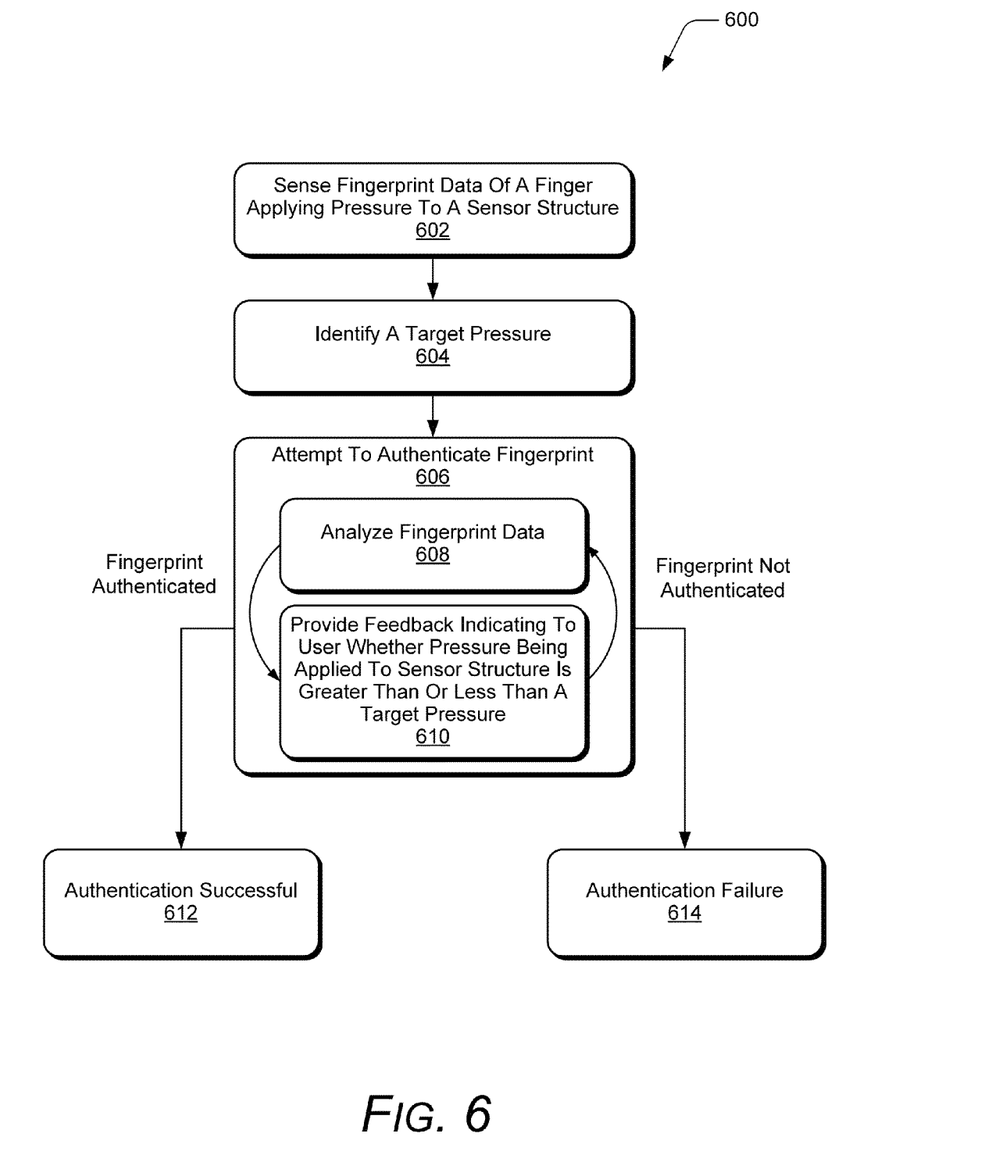
FIG. 6 illustrates an example process in which feedback is provided indicating whether too much pressure or too little pressure is being applied to a sensor structure in accordance with one or more embodiments.

FIG. 6 illustrates an example process 600 in which feedback is provided indicating whether too much pressure or too little pressure is being applied to a sensor structure 200 in accordance with one or more embodiments. In process 600, the fingerprint data of a user's finger applying pressure to a sensor structure 200 is sensed (act 602). The sensor structure 200 includes a fingerprint sensor 112 and a piezo structure 114, as illustrated in FIG. 2. Thus, a user applying pressure to the sensor structure 200 can be detected by the piezo structure 114 as discussed above, and the fingerprint data can be sensed by the fingerprint sensor 112 as discussed above.

A target pressure is identified (act 604). In one or more embodiments, the target pressure is maintained as part of the authentication data for the user. The target pressure can be determined in a variety of different manners. In an embodiment the target pressure is determined during an enrollment process. During the enrollment process, the user fingerprint data is sensed (e.g., by the fingerprint sensor as discussed above) and stored as authentication data. Additionally, the pressure being applied by the user at the time that this user fingerprint data is sensed is also stored as associated with the stored fingerprint data and used as the target pressure when the user subsequently desires to have his or her fingerprint authenticated (e.g., by applying pressure to the sensor structure).

In another embodiment, during the enrollment process, multiple samples of fingerprint data for the user are sensed. One of the multiple samples is determined to be stored as authentication data for the user, and the pressure being applied by the user at the time the determined sample is sensed is stored as the target pressure. The one of the multiple samples that is to be stored as authentication data can be determined in a variety of different manners. For example, the number of locations where minutiae or ridges are identified in each sample can be identified and the sample having the largest number of locations where minutiae or ridges are identified is determined to be the sample stored as authentication data. By way of another example, a score or ranking can be assigned to each sample using various criteria, and the sample having the highest (or alternatively lowest) score or ranking is determined to be the sample stored as authentication data.

Alternatively, the target pressure can be determined in other manners. For example, during a previous attempt by the user to have his or her fingerprint authenticated, an indication of the pressure being applied to the sensor structure 200 by the user at the time that the fingerprint data that matched the stored fingerprint data was sensed can be saved. This saved indication of the pressure can be associated with the stored fingerprint data for the user and used as the target pressure during subsequent attempts by the user to have his or her fingerprint authenticated.

The control system attempts to authenticate the fingerprint (act 606). The fingerprint is authenticated by analyzing the fingerprint data (act 608). If analysis of the fingerprint data determines that the fingerprint data matches fingerprint data stored as authentication data for the user as discussed above, then the fingerprint satisfies the authentication data and is successfully authenticated.

While attempting to authenticate the fingerprint in act 606, feedback is provided indicating to the user whether the pressure being applied to the sensor structure 200 is greater than or less than the target pressure (act 610). The analysis in act 608 and the providing of feedback in act 610 are performed repeatedly while the user is applying pressure to the sensor structure 200, optionally providing continual feedback to the user regarding whether he or she should apply more or less pressure to the sensor structure 200.

The feedback module 310 of FIG. 3 can provide feedback in various different manners. In one embodiment, the feedback is haptic feedback. The feedback module 310 communicates with the vibration control module 302 of FIG. 3 to change the vibration of the piezo structure in the appropriate manner based on the type of feedback to be provided. Because the sensor structure 200 includes the piezo structure 114, the vibration of the sensor structure 200 is changed by altering the vibration of the piezo structure 114. Different vibration patterns can be used for different types of feedback, such as one pattern being used to indicate that greater than the target pressure is being applied to the sensor structure 200, and a different pattern being used to indicate that less than the target pressure is being applied to the sensor structure.

In another embodiment, the feedback module 310 provides audible feedback, such as by changing the vibration of the piezo structure 114 so that it emits an audible tone, applying one or more signals to a speaker, and so forth. Different audible signals can be used for different types of feedback, such as one sound or audible pattern being used to indicate that greater than the target pressure is being applied to the sensor structure 200, and a different sound or audible pattern being used to indicate that less than the target pressure is being applied to the sensor structure 200.

In yet another embodiment, the feedback module 310 provides visual feedback, such as by illuminating particular lights (e.g., particular light emitting diodes (LEDs)), displaying particular colors using one or more lights, displaying arrows or other indicators on a display screen, and so forth. Different visual signals can be used for different types of feedback. For example, one color can be used to indicate that greater than the target pressure is being applied to the sensor structure 200, and a different color can be used to indicate that less than the target pressure is being applied to the sensor structure 200. By way of another example, one symbol can be displayed to indicate that greater than the target pressure is being applied to the sensor structure 200, and a different symbol can be displayed to indicate that less than the target pressure is being applied to the sensor structure 200. The display could also be used to indicate the need to relocate the finger relative to the sensor structure 200.

It should be noted that the analysis of the fingerprint data in act 608 can be performed repeatedly regardless of the pressure being applied by the user to the sensor structure. Alternatively, the fingerprint data may not be analyzed in act 608 until the pressure being applied to the sensor structure 200 by the user is close to (e.g., within a threshold amount of) the target pressure.

When the fingerprint satisfies the authentication data, the fingerprint authentication succeeds (act 612). On the other hand, when the fingerprint does not satisfy the authentication data, the fingerprint authentication fails (act 614). In situations in which the fingerprint does not satisfy the authentication data, the control system 116 can determine how long to analyze the fingerprint data in an attempt to successfully authenticate the fingerprint data in a variety of different manners as discussed above with reference to process 400 of FIG. 4.

It should be noted that act 610 of process 600 can be implemented in process 400 of FIG. 4 or process 500 of FIG. 5 by changing the vibration of the sensor structure in act 410 in the manner as discussed in act 610 of process 600. Thus, in process 400 or process 500, the manner in which the vibration is changed in act 410 can vary based on whether the pressure being applied to the sensor structure is greater than or less than the target pressure.

Figure 7:
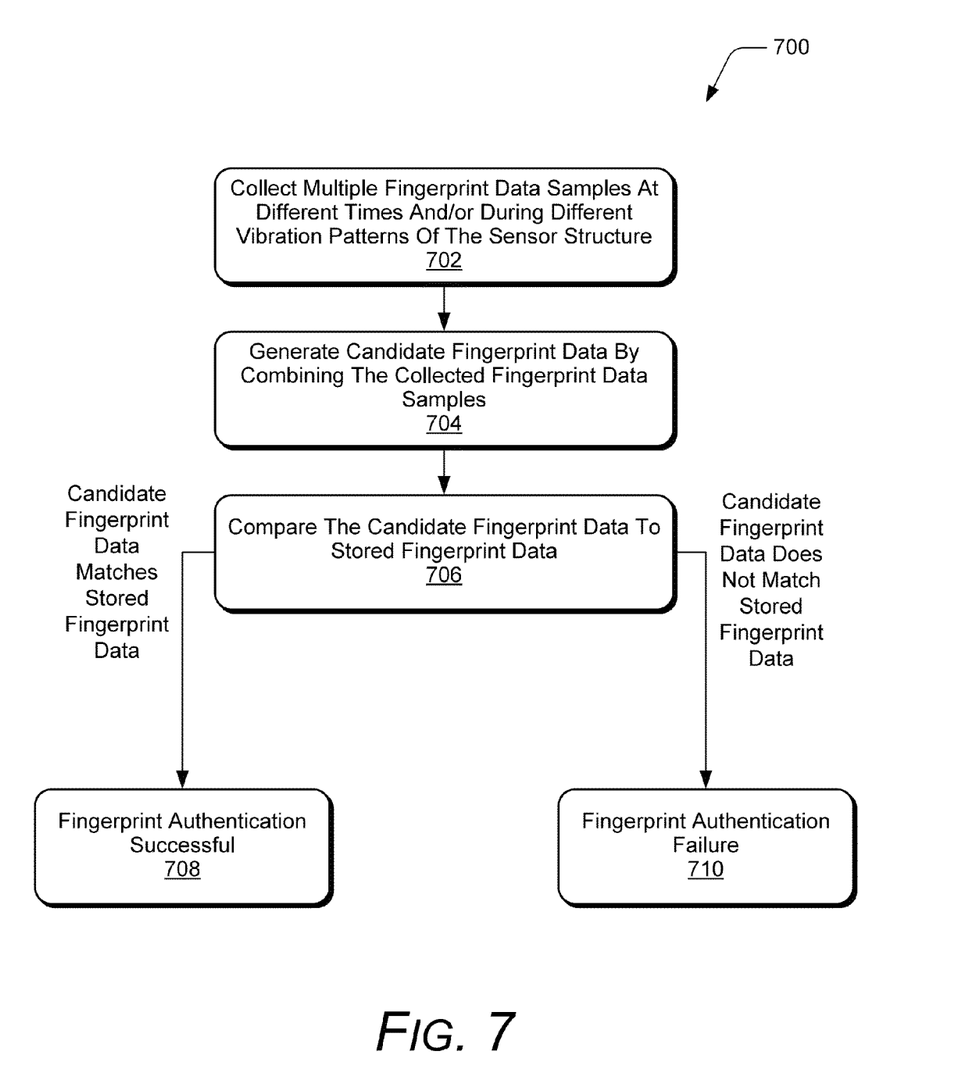
FIG. 7 illustrates an example process in which samples of sensed fingerprint data are combined to authenticate the fingerprint in accordance with one or more embodiments.

FIG. 7 illustrates an example process 700 in which samples of sensed fingerprint data are combined to authenticate the fingerprint in accordance with one or more embodiments. In process 700, fingerprint data of a user's finger applying pressure to a sensor structure 200 is sensed (act 702). The sensor structure includes a fingerprint sensor 112 and a piezo structure 114 as illustrated in FIG. 2. Thus, a user applying pressure to the sensor structure 200 can be detected by the piezo structure 114 as discussed above, and the fingerprint data can be sensed by the fingerprint sensor 112 as discussed above.

The control system collects multiple fingerprint data samples in act 702. These multiple fingerprint data samples are fingerprint data sensed at different times and/or during different vibration patterns of the sensor structure 200. Thus, as part of act 702, the vibration of the sensor structure 200 is changed. The vibration of the sensor structure can be changed by altering the vibration of the piezo structure in various manners as discussed above.

Candidate fingerprint data is generated (act 704) by combining the fingerprint data samples collected in act 702. The collected fingerprint data samples can be combined in a variety of different manners. In one or more embodiments, the collected fingerprint data samples are combined by averaging locations of minutiae or ridges detected in each collected sample. For example, each location in each sample can have a value of zero indicating that a minutiae or ridge was not sensed at that location, can have a value of one indicating a minutiae or ridge was sensed at that location, or can have a value indicating a likelihood or probability of a minutiae or ridge being sensed at that location, and so forth. These values for corresponding locations can be averaged together for the multiple collected samples.

Alternatively, the collected fingerprint data samples can be combined in other manners. For example, each location in each sample can have a value of zero indicating that a minutiae or ridge was not sensed at that location, or a value of one indicating a minutiae or ridge was sensed at that location. The values for corresponding locations can be logically OR'd together, so that if a minutiae or ridge was sensed at a location in at least one of the collected samples then that location in the candidate fingerprint data indicates that a minutiae or ridge was sensed at that location, and otherwise the candidate fingerprint data indicates that a minutiae or ridge was not sensed at that location. Alternatively, the values for corresponding locations can be logically AND'd together, so that if a minutiae or ridge was sensed at a location in all of the collected samples then that location in the candidate fingerprint data indicates that a minutiae or ridge was sensed at that location, and otherwise the candidate fingerprint data indicates that a minutiae or ridge was not sensed at that location.

In the combining of fingerprint data samples in act 704, all of the data samples collected in act 702 can be combined or alternatively a subset of the samples collected in act 702 can be combined. The collected samples that are included in the subset of the samples can be determined in a variety of different manners. For example, the pressure applied to the sensor structure 200 at the time each fingerprint data sample is sensed can be identified, and the subset can include fingerprint data samples sensed when the pressure applied to the sensor structure 200 was within a particular pressure range. By way of another example, the subset can include ones of the fingerprint data samples that are similar to one another (e.g., two fingerprint data samples being similar to one another if minutiae or ridges are detected in at least a threshold number of corresponding locations in the two fingerprint data samples).

The candidate fingerprint data is then compared to stored fingerprint data (act 706). If the candidate fingerprint data matches the stored fingerprint data (satisfies authentication data), the fingerprint authentication succeeds (act 708). On the other hand, if the candidate fingerprint data does not match the stored fingerprint data (does not satisfy authentication data), the fingerprint authentication fails (act 710).

The stored fingerprint data can be determined in a variety of different manners. In one or more embodiments, the stored fingerprint data is generated during an enrollment process in the same manner as the candidate fingerprint data is generated in act 704. Alternatively, the stored fingerprint data is the candidate fingerprint data generated during a previous attempt by the user to have his or her fingerprint authenticated, a combination of collected fingerprint data samples from multiple previous attempts by the user to have his or her fingerprint authenticated (the collected fingerprint data samples being combined in a variety of different manners analogous to the discussion in act 704), and so forth.

In one or more embodiments, acts 406, 408, and 410 of process 400 can be implemented by acts 702, 704, and 706 of process 700. Similarly, acts 408, 410, and 502 of process 500 can be implemented by acts 702, 704, and 706 of process 700. Thus, in process 400 or process 500, the sensed fingerprint data can be multiple fingerprint data samples collected and combined as discussed in process 700.

Figure 8:
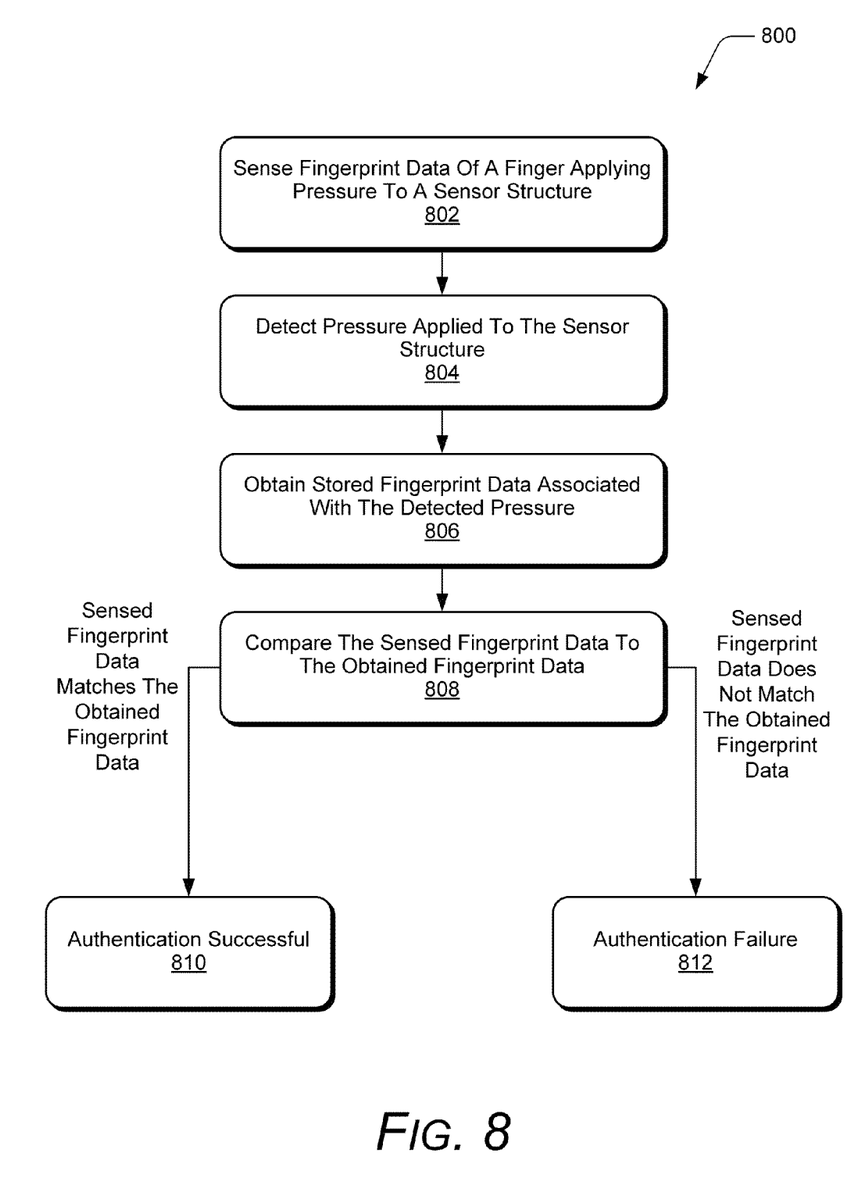
FIG. 8 illustrates an example process in which sensed fingerprint data is compared to stored fingerprint data based on the pressure being applied by the user in accordance with one or more embodiments.

FIG. 8 illustrates an example process 800 in which sensed fingerprint data is compared to stored fingerprint data based on the pressure being applied by the user in accordance with one or more embodiments. In process 800, fingerprint data of a finger of a user applying pressure to a sensor structure is sensed (act 802). The control system also detects the pressure applied to the sensor structure (act 804). The sensor structure includes a fingerprint sensor and a piezo structure, such as the fingerprint sensor 112 and the piezo structure 114 of FIG. 2. Thus, a user applying pressure to the sensor structure, as well as the pressure applied to the sensor structure, can be detected by the piezo structure as discussed above, and the fingerprint data can be sensed by the fingerprint sensor as discussed above.

Stored fingerprint data associated with the detected pressure for the user is obtained (act 806). The stored fingerprint data is stored as authentication data as discussed above. Multiple different samples of fingerprint data can be stored as authentication data, each sample of fingerprint data being associated with a particular pressure. The stored fingerprint data associated with the pressure that matches the pressure detected in act 804 is obtained in act 806. The pressure that matches the pressure detected in act 804 can be determined in different manners, such as being the pressure that is closest to the pressure detected in act 804.

The stored fingerprint data obtained in act 806 is then compared to the sensed fingerprint data (act 808). If the obtained fingerprint data matches the sensed fingerprint data, then the fingerprint authentication is successful (act 810). On the other hand, if the obtained fingerprint data does not match the sensed fingerprint data, then the fingerprint authentication fails (act 812).

In process 800, the authentication data includes one or more samples of fingerprint data and associated pressures. The samples can be obtained in a variety of different manners. In one embodiment, the samples are obtained during an enrollment process. During the enrollment process, the user applies different pressures to a sensor structure 200 and, as those different pressures are applied, the fingerprint data of the finger is stored along with the pressure being applied at the time the fingerprint data is stored. Alternatively, each time the user has his or her fingerprint successfully authenticated, the sensed fingerprint data and pressure applied to the sensor structure is stored as one of the multiple samples. If the detected pressure is the same as (e.g., equal to or within a threshold amount of) the pressure of a sample already stored, various actions can be taken. For example, the newly sensed fingerprint data and associated pressure can be ignored (not stored as one of the multiple samples), can replace the fingerprint data and associated pressure of the sample that is the same as the detected pressure, can be combined with the fingerprint data (e.g., in any of a variety of manners analogous to the discussion above regarding generating candidate fingerprint data in process 700 of FIG. 7) and one of the associated pressures selected or the associated pressures combined (e.g., averaged), and so forth.

By way of another example, the sample(s) of fingerprint data and associated pressures can include a single sample of fingerprint data and associated pressure. The single sample of fingerprint data can be identified in different manners. In one or more embodiments, during an enrollment process multiple samples of fingerprint data for the user are sensed and one of those multiple samples is selected as the single sample of fingerprint data. The single sample can be the sample having the largest number of locations where minutiae or ridges are identified, be the sample having the highest (or alternatively lowest) score or ranking based on various other criteria, and so forth.

It should be noted that in process 800, no vibration of the sensor structure 200 need be performed. Alternatively, the sensor structure 200 can be vibrated in various manners as discussed above. For example, while sensing the fingerprint data and detecting the pressure in acts 802 and 804, the vibration of the sensor structure 200 may be changed as discussed above (e.g., as discussed with reference to act 410 of FIG. 4 or FIG. 5, or with reference to act 610 of FIG. 6)

Figure 9:
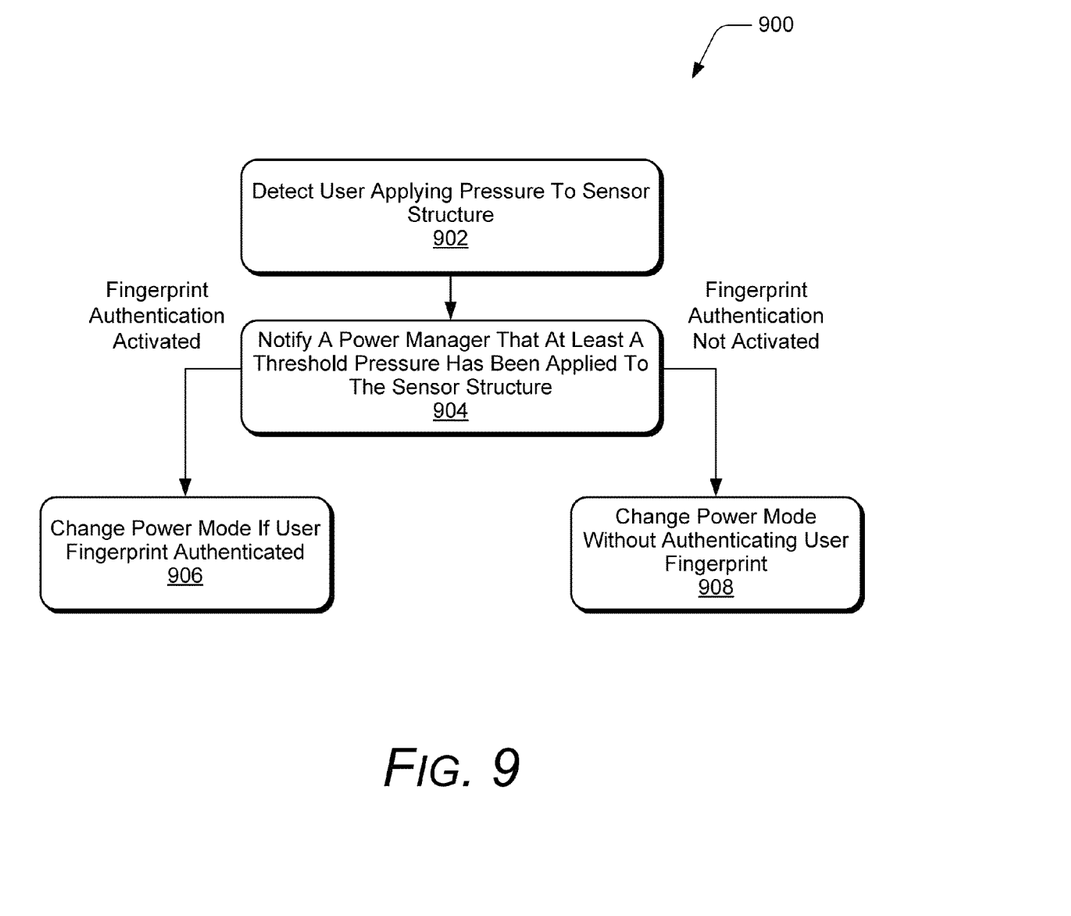
FIG. 9 illustrates an example process in which the user's finger applying pressure to a sensor structure is used to change a power mode of a device in accordance with one or more embodiments.

FIG. 9 illustrates an example process 900 in which the user's finger applying pressure to a sensor structure 200 is used to change a power mode of a device 102 in accordance with one or more embodiments. In process 900, a user applying pressure to the sensor structure 200 is detected (act 902). The sensor structure 200 includes a fingerprint sensor 112 and a piezo structure 114. A user applying pressure to the sensor structure 200 is detected by the piezo structure 114 in response to at least a threshold pressure being applied to the piezo structure 114.

In response to detecting the user applying pressure to the sensor structure 200, the notification module 312 notifies a power manager 120 that at least the threshold pressure has been applied to the piezo structure 114 (act 904). The power manager 120 responds to this notification based on whether fingerprint authentication is activated for the device 102. In one embodiment, fingerprint authentication for the device 102 can be activated and/or deactivated by a user of the device 102, such as by selection of a configuration setting. In another embodiment, fingerprint authentication for the device can be activated and/or deactivated by another entity, such as an administrator of the device 102.

When fingerprint authentication is activated for the device 102, the power manager 120 changes the power mode of the device only if the user's fingerprint is authenticated by the authentication module 306 (act 906). The change in power mode in act 906 can be, for example, powering on the device 102 if the device 102 is powered off, or transitioning to a higher power usage mode if the device 102 is powered on but in a low power usage mode. It should be noted that the power manager 120 may perform part of a power-on sequence for the device 102 in order for the authentication module 306 to authenticate the user's fingerprint, but need not complete the power-on sequence or fully power-on the device 102.

When fingerprint authentication is not activated for the device 102, the power manager 120 changes the power mode of the device without regard for whether the authentication module 306 verifies the user's fingerprint (act 908). The change in power mode in act 908 can be, for example, powering on the device 102 if the device 102 is powered off, or transitioning to a higher power usage mode if the device 102 is powered on but in a low power usage mode.

It should be noted that in process 900, no vibration of the sensor structure 200 need be performed. Alternatively, the sensor structure 200 can be vibrated in various manners as discussed above. For example, authenticating the user fingerprint in act 906 can be performed using any of the techniques discussed above with reference to FIGS. 4-8.

Figure 10:
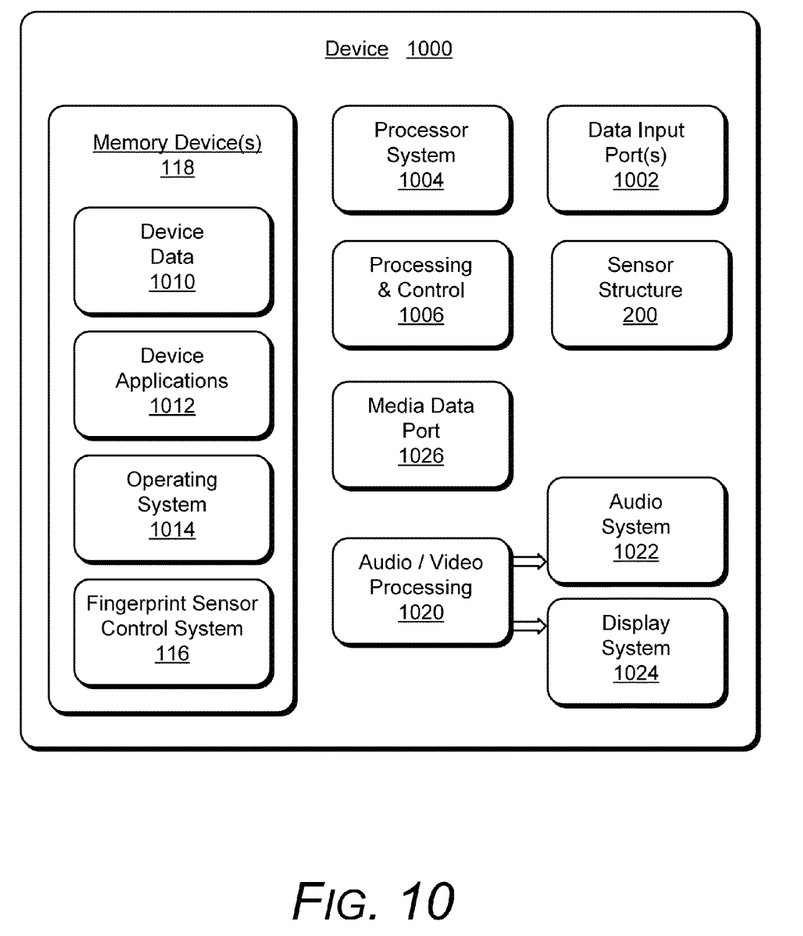
FIG. 10 illustrates various components of an example electronic device that can implement embodiments of the piezo based fingerprint sensor structure.

FIG. 10 illustrates various components of an example electronic device 1000 that can be implemented as a device as described with reference to any of the previous FIGS. 1-9. The device may be implemented as any one or combination of a fixed or mobile device, in any form of a consumer, computer, portable, user, communication, phone, navigation, gaming, messaging, Web browsing, paging, media playback, and/or other type of electronic device, such as the device 102 described with reference to FIG. 1.

The electronic device 1000 can include one or more data input ports 1002 via which any type of data, media content, and/or inputs can be received, such as user-selectable inputs, messages, music, television content, recorded video content, and any other type of audio, video, and/or image data received from any content and/or data source. The data input ports 1002 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 1000 of this example includes a processor system 1004 (e.g., any of microprocessors, controllers, and the like), or a processor and memory system (e.g., implemented in an SoC), which process computer-executable instructions to control operation of the device. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1006. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 1000 also includes one or more memory devices 118 that enable data storage, examples of which include random access memory (RAM), non-volatile memory (e.g., read-only memory (ROM), flash memory, EPROM, EEPROM, etc.), and a disk storage device. A memory device 118 provides data storage mechanisms to store the device data 1010, other types of information and/or data, and various device applications 1012 (e.g., software applications). For example, an operating system 1014 can be maintained as software instructions with a memory device and executed by the processor system 1004.

In embodiments, the electronic device 1000 includes a fingerprint sensor control system 116, described with reference to FIG. 1 or FIG. 3. Although represented as a software implementation, the fingerprint sensor control system 116 may be implemented as any form of a control application, software application, signal-processing and control module, firmware that is installed on the device, a hardware implementation of the controller, and so on. The electronic device 1000 also includes a sensor structure 200 described with reference to FIG. 2.

The electronic device 1000 can also include an audio and/or video processing system 1020 that processes audio data and/or passes through the audio and video data to an audio system 1022 and/or to a display system 1024. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1026. In implementations, the audio system and/or the display system are external components to the electronic device. Alternatively or in addition, the display system can be an integrated component of the example electronic device, such as part of an integrated touch interface.

Although embodiments of variable antenna match linearity have been described in language specific to features and/or methods, the subject of the appended claims is not necessarily limited to the specific features or methods described. Rather, the specific features and methods are disclosed as example implementations of variable antenna match linearity.

The invention claimed is:

1. A method comprising:
   starting vibrating a sensor structure, in response to at least a first threshold pressure being applied to the sensor structure of a device by a finger;
   analyzing fingerprint data sensed by the sensor structure, to authenticate a fingerprint of the finger;
   varying vibration of the sensor structure while analyzing the fingerprint data; and
   ceasing vibrating the sensor structure, in response to completing analyzing of the fingerprint data.

2. The method as recited in claim 1, the sensor structure comprising a fingerprint sensor situated on a piezo structure.

3. The method as recited in claim 1, further comprising collecting the fingerprint data while varying vibration of the sensor structure, and the analyzing comprising analyzing the fingerprint data after collection of the fingerprint data is completed.

4. The method as recited in claim 1, further comprising in response to at least a second threshold pressure being applied to the sensor structure, providing feedback indicating to a user that too much pressure is being applied to the sensor structure, the second threshold pressure being greater than the first threshold pressure.

5. The method as recited in claim 1, further comprising:
   identifying a target pressure; and
   providing feedback indicating to the user whether a current pressure being applied to the sensor structure is greater than the target pressure or less than the target pressure.

6. The method as recited in claim 5, the providing feedback comprising varying vibration of the sensor structure in a first manner in response to the current pressure being greater than the target pressure, and varying vibration of the sensor structure in a second manner in response to the current pressure being less than the target pressure.

7. The method as recited in claim 5, the providing feedback comprising presenting by the device a first color in response to the current pressure being greater than the target pressure, and presenting by the device a second color in response to the current pressure being less than the target pressure.

8. The method as recited in claim 5, the providing feedback comprising providing a first audible tone in response to the current pressure being greater than the target pressure, and providing a second audible tone in response to the current pressure being less than the target pressure.

9. The method as recited in claim 5, the target pressure having been identified during an enrollment process in which the fingerprint data was sensed and stored for use in subsequently authenticating fingerprints.

10. The method as recited in claim 1, the analyzing comprising:
   collecting multiple fingerprint data samples at different times and while the sensor structure is vibrated using various different vibration patterns;
   generating candidate fingerprint data by combining the collected fingerprint data samples;
   comparing the candidate fingerprint data to stored fingerprint data;

authenticating the fingerprint in response to the candidate fingerprint data matching the stored fingerprint data; and failing authentication of the fingerprint in response to the candidate fingerprint data not matching the stored fingerprint data.

11. The method as recited in claim 10, the combining the collected fingerprint data samples comprising averaging locations of minutiae in the multiple fingerprint data samples.

12. A device comprising:
   a vibration control module configured to alter a vibration pattern of a piezo structure of the device over a duration of time;
   a fingerprint sensor configured to detect multiple fingerprint data samples of a finger of a user over the duration of time, the multiple fingerprint data samples being detected during multiple different vibration patterns of the piezo structure; and
   an authentication module configured to combine the multiple fingerprint data samples by averaging locations of minutiae in the multiple fingerprint data samples, and to authenticate a fingerprint of the user based on a combination of the multiple fingerprint data samples.

13. The device as recited in claim 12, the fingerprint sensor being situated on the piezo structure.

14. The device as recited in claim 13, further comprising a feedback module configured to in response to at least a threshold pressure being applied to the piezo structure, provide feedback indicating to the user that too much pressure is being applied to the fingerprint sensor.

15. A device comprising:
   a sensor structure including,
      a fingerprint sensor configured to sense a fingerprint data sample of a finger of a user, and
      a piezo structure configured to detect a pressure applied to the sensor structure at a time when the fingerprint data sample is sensed;
   an authentication module configured to authenticate a fingerprint of the user based at least in part on the fingerprint data sample and the pressure applied to the sensor structure at the time when the fingerprint data sample is sensed; and
   a memory device configured to store authentication data, the authentication data comprising samples of fingerprint data associated with the sensor structure, each of the samples of fingerprint data being associated with a particular pressure.

16. The device as recited in claim 15, the authentication module is configured to:
   identify one of the samples of fingerprint data in which the particular pressure matches the pressure applied to the sensor structure at the time when the fingerprint data sample is sensed;
   compare the fingerprint data sample to the one of the samples of fingerprint data; and
   authenticate the fingerprint of the user in response to the fingerprint data sample matching the one of the samples of fingerprint data.

17. A device comprising:
   a sensor structure including,
      a piezo structure configured to detect a pressure applied to the sensor structure, and
      a fingerprint sensor situated on the piezo structure and configured to sense fingerprint data of a finger of a user;
   a notification module configured to notify, in response to at least a threshold pressure being applied to the piezo structure, a power manager to change a power mode of the device; and
   an authentication module configured to authenticate a fingerprint of the user based at least in part on the sensed fingerprint data sample, and the power manager being configured to change the power mode of the device only if authentication of the fingerprint is successful.

18. The device as recited in claim 17, the power manager being configured to change the power mode of the device by initiating a power-on sequence for the device in response to being notified that at least the threshold pressure has been applied to the piezo structure.

19. The device as recited in claim 17, the power manager being configured to change the power mode of the device by initiating a wake sequence to wake the device from a sleep mode in response to being notified that at least the threshold pressure has been applied to the piezo structure.

* * * * *